| United States Patent [19] | [11] Patent Number: 5,024,715 |
|---|---|
| Trussler | [45] Date of Patent: Jun. 18, 1991 |

[54] METHOD FOR FABRICATING SECONDARY CONTAINMENT CAPSULE FOR UNDERGROUND STORAGE TANK

[75] Inventor: Jared A. Trussler, Pismo Beach, Calif.

[73] Assignee: Trusco Tank, Inc., San Luis Obispo, Calif.

[21] Appl. No.: 438,539

[22] Filed: Nov. 16, 1989

Related U.S. Application Data

[63] Continuation of Ser. No. 099,546, Sep. 22, 1987, abandoned, which is a continuation-in-part of Ser. No. 035,412, Apr. 6, 1987, abandoned.

[51] Int. Cl.$^5$ .............................................. B32B 31/04
[52] U.S. Cl. .................................... 156/245; 156/293; 156/304.2; 156/304.3; 29/455.1; 29/463; 220/445
[58] Field of Search ............... 156/153, 154, 173, 174, 156/245, 304.2, 304.3; 29/455.1, 463; 73/49.2 R, 49.2 T, 49.3; 220/18, 85 B, 85 F, 85 S, 445, 449, 414

[56] References Cited

U.S. PATENT DOCUMENTS

| 2,739,917 | 3/1956 | Schulze | 156/245 |
|---|---|---|---|
| 3,655,468 | 4/1972 | Bastone et al. | 156/173 |
| 4,363,687 | 12/1982 | Anderson | 156/158 |
| 4,552,281 | 11/1985 | Schneider | 220/83 |
| 4,651,893 | 3/1987 | Mooney | 73/49.2 T |
| 4,744,137 | 5/1988 | Palazzo | 220/445 |

Primary Examiner—Caleb Weston
Attorney, Agent, or Firm—Blakely, Sokoloff, Taylor & Zafman

[57] ABSTRACT

A secondary containment capsule for enclosing primary storage tanks made of one or more standard axial portions and end caps is disclosed. Each of these segments are separately molded from a curable plastic material such as fiberglass reinforced polyester. Axial segments are separately slid over the primary tank and joined together at their mating ends, forming a longitudinal cylinder covering the longitudinal sides of the primary tank. The molded end caps are then placed over the outer ends of the longitudinal cylinder formed by the axial segments to completely enclose the primary tank. The same end caps and axial segments can be used for enclosing primary tanks having the same diameter but different lengths. In another embodiment, the one or more substantially cylindrical sections of the secondary containment capsule are formed on a male mold and split longitudinally for removal from the mold. Such section or sections are then clamped around the primary storage tank and rejoined on the split, with molded end caps also being bonded in place. This facilitates removal of the section from a suitably textured mold, easy placement of the split section over the tank and the light clamping of the section around the tank until rejoined, providing the desired fluid migration space between the tank and the containment capsule without looseness therebetween.

38 Claims, 2 Drawing Sheets

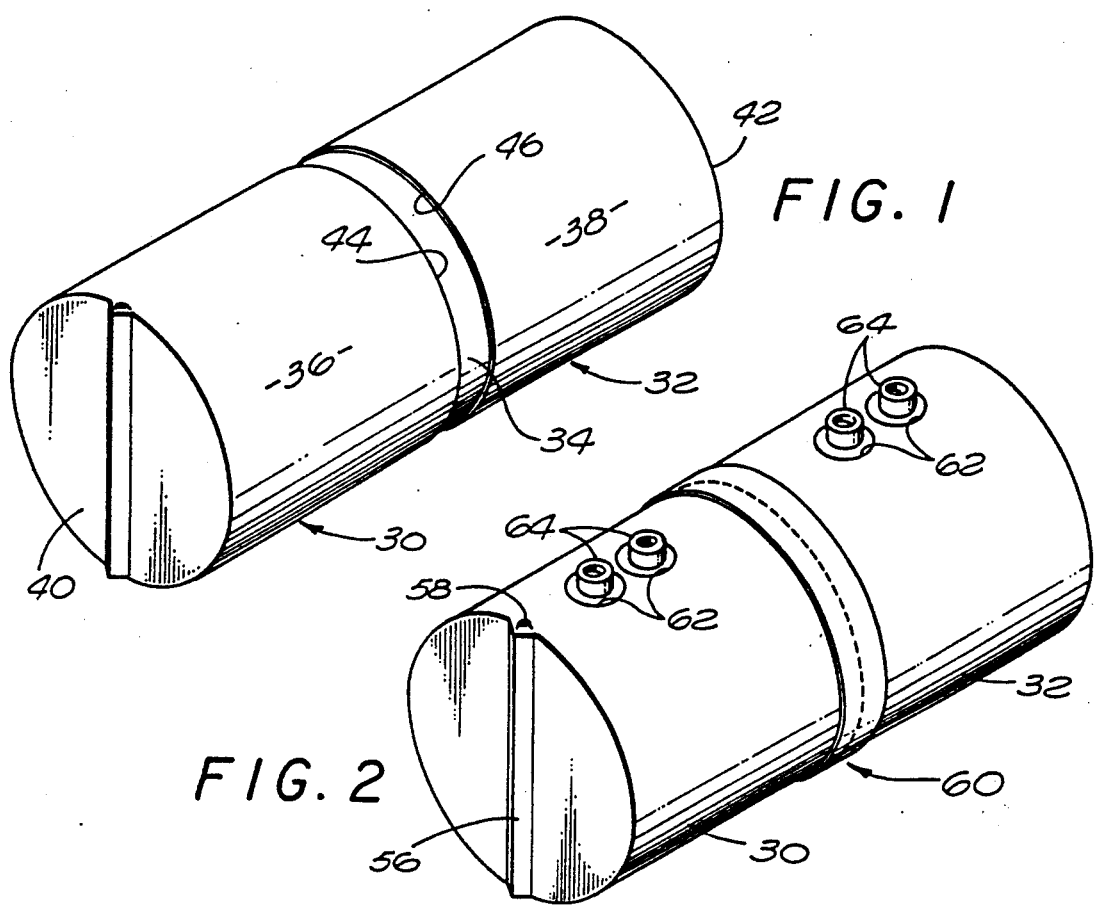
FIG. 1
FIG. 2
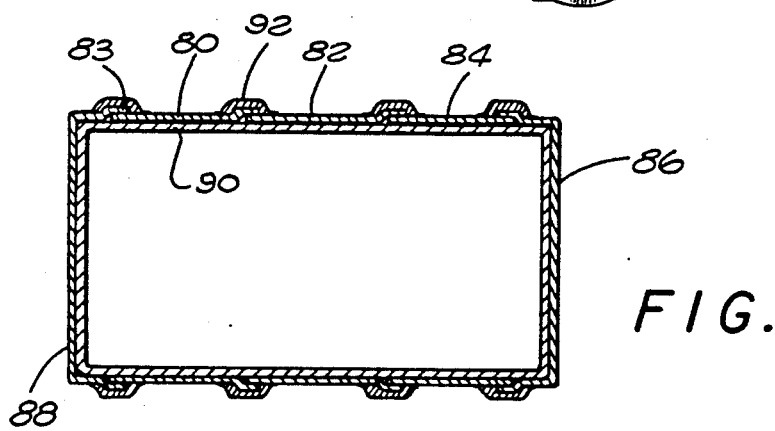
FIG. 3
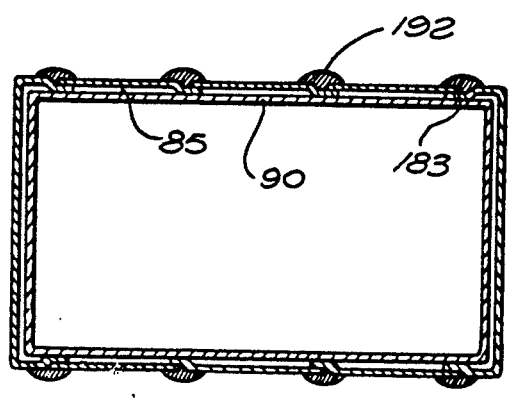
FIG. 4

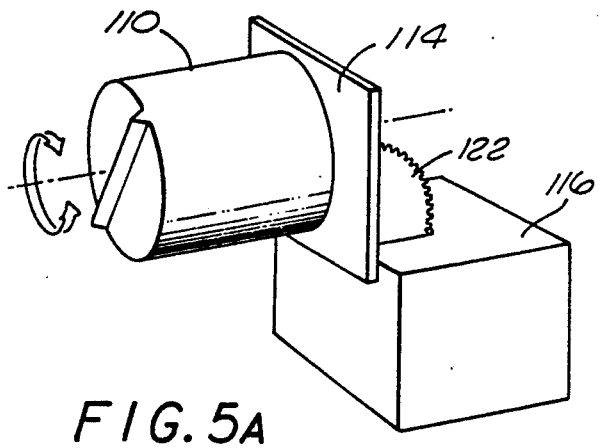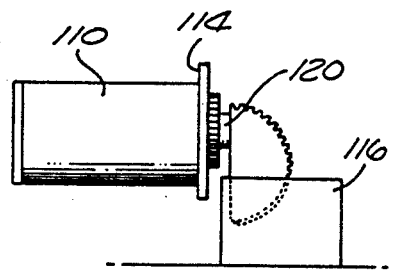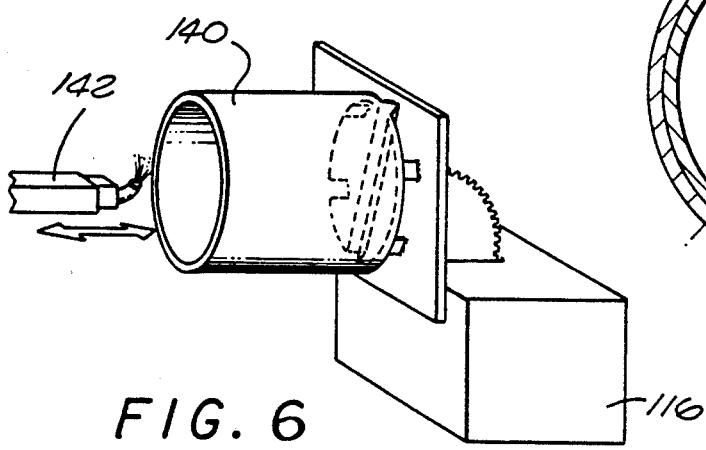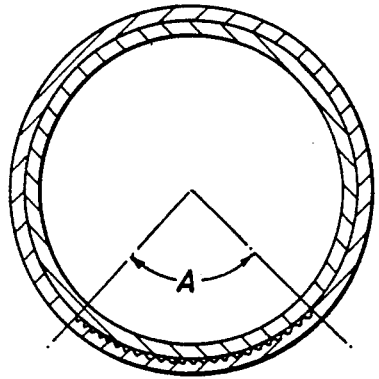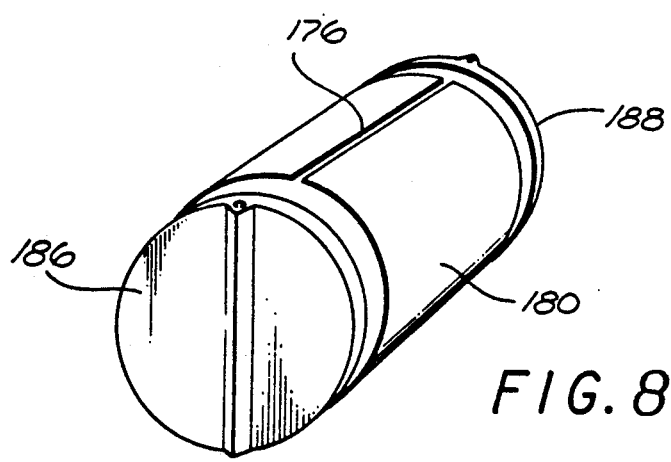

METHOD FOR FABRICATING SECONDARY CONTAINMENT CAPSULE FOR UNDERGROUND STORAGE TANK

This is a continuation of application Ser. No. 099,546 filed Sept. 22, 1987, abandoned, which in turn is a continuation-in-part of my prior application entitled "Secondary Containment Capsule for Underground Storage Tank and Method for Fabricating the Same", Ser. No. 035,412, filed Apr. 6, 1987, abandoned.

BACKGROUND OF THE INVENTION

1. Field of the Invention

The present invention relates to the field of underground storage tanks and, more specifically, to a secondary containment capsule for providing added leakage protection and leakage detection capabilities for underground petroleum storage tanks.

2. Prior Art

In recent years, concerns have been raised over the environmentally hazardous leakage of petroleum products from insecure underground storage tanks. Several states have adopted laws requiring new underground tanks to provide some form of secondary containment to prevent leakage from single wall tanks. Some state codes also require that such new tanks incorporate a leak detection means capable of detecting leakage of the stored product from the primary containment means into the secondary containment means or leakage of ground water or other liquids from outside the secondary containment means through the secondary container to provide advanced warning of any leakage.

One way to provide secondary containment for a primary storage tank is to form a second tank or envelope around the first tank, creating, in essence, a double walled tank. Several kinds of such double walled tanks are known in the prior art. A tank having a rigid steel or fiberglass (fiberglass reinforced plastic or FRP) inner tank and a flexible, polyethylene outer jacket is disclosed by U.S. Pat. No. 4,607,522. U.S. Pat. No. 4,561,292 discloses a tank having two fiberglass walls, the second fiberglass wall being formed by applying a fiberglass layer over a grid of plastic mats separated by fiberglass ribs. U.S. Pat. No. 4,537,328 discloses a tank with a steel inner tank and a fiberglass outer tank, the fiberglass outer tank being formed by applying fiberglass sheets over a grid of semicircular PVC pipe segments attached to the surface of the inner steel tank. Other double walled storage tank designs are disclosed by U.S. Pat. Nos. 4,568,925 and 4,523,454.

Although the double wall tanks of the prior art provide a greater degree of leakage protection than single walled tanks, they are also more difficult to manufacture and more expensive. In the prior art, the secondary tanks are custom formed directly on the primary tank, requiring the use of large fixtures for holding the primary tank while the secondary tank is being formed. Mass production of the secondary tank, separately from the primary tank, is therefore not possible.

BRIEF SUMMARY OF THE INVENTION

The present invention comprises a secondary containment capsule for enclosing primary storage tanks made of one or more plurality standard axial portions and end caps. Each of these segments are separately molded from a curable plastic material such as a fiberglass reinforced plastic. Axial segments are separately slid over the primary tank and joined together at their mating ends, forming a longitudinal cylinder covering the longitudinal sides of the primary tank. The molded end caps are placed over the outer ends of the longitudinal cylinder formed by the axial segments to completely enclose the primary tank. The same end caps and axial segments can be used for enclosing primary tanks having the same diameter but different lengths.

To enhance fluid migration in the interstice between the outer surface of the primary tank and the inner surface of the secondary containment capsule, at least a portion of the inside surfaces of the molded exterior containment capsule segments may be textured by applying a texturing agent or by incorporating a textured surface in the mold from which the capsule segments are formed. Such texturing ensures that, at locations where the outside wall of the primary tank rests on or is in contact with the inner wall of the exterior containment capsule, spaces or cavities remain to allow the migration of fluid between the two walls. The texturing agent may comprise a mixture of polyester resin and glass beads, sand, or other particles such that the mixture will adhere to the interior walls of the secondary containment capsule and will form a rough surface. Alternatively, the surface texture of the segments as formed may be sufficiently rough without the need of any added texture.

The present invention therefore allows the mass production of axial cylindrical sections and end cap sections that can be used to provide secondary containment for various lengths of primary tanks of like diameter. The invention does not require the use of large molds, or complicated fixtures to hold the primary tank for the secondary envelope to be applied. The invention also eliminates the need for a separate interstitial separator to maintain an interstice between the primary and secondary containers to allow migration of fluid between the two containers to allow leak detection.

In an alternative embodiment of the invention, the secondary containment capsule comprises two preformed halves that are placed over the primary tank from either end and joined at the middle. In a still further embodiment, the one or more substantially cylindrical sections of the secondary containment capsule are formed on a male mold and split longitudinally for removal from the mold. Such section or sections are then clamped around the primary storage tank and rejoined on the split, with molded end caps also being bonded in place. This facilitates removal of the section from a suitably textured mold, easy placement of the split section over the tank and the light clamping of the section around the tank until rejoined, providing the desired fluid migration space between the tank and the containment capsule without looseness therebetween.

BRIEF DESCRIPTION OF THE DRAWINGS

FIG. 1 is a perspective view illustrating the assembly of one embodiment of the secondary containment capsule of the present invention to a primary storage tank.

FIG. 2 is a perspective view illustrating a second embodiment of the present invention in its fully assembled form.

FIG. 3 is a cross sectional view of a storage tank comprising a third embodiment of the present invention.

FIG. 4 is a sectional view of a storage tank comprising a fourth embodiment of the present invention.

FIG. 5a is a perspective view illustrating one embodiment of a male mold used to form the secondary containment capsule of the present invention mounted on a rotating positioner.

FIG. 5b is a side view illustrating the mold and positioner of FIG. 5a.

FIG. 6 is a perspective view illustrating the formation of one embodiment of the secondary containment capsule of the present invention utilizing a female mold.

FIG. 7 is a sectional view of one embodiment of the present invention illustrating the application of the texturing agent.

FIG. 8 is a perspective view illustrating a fifth embodiment of the present invention.

DETAILED DESCRIPTION OF THE INVENTION

An improved secondary containment vessel for underground storage tanks and a method for making the same are disclosed. In the following description, for purposes of explanation, numerous details are set forth, such as specific materials, arrangements and proportions in order to provide a thorough understanding of the present invention. However, it will be apparent to one skilled in the art that the invention may be practiced without these specific details. In other instances, well known articles, such as primary storage tanks, fiberglass mats, and chopper guns have not been described in detail in order not to obscure the present invention unnecessarily.

FIG. 1 illustrates the assembly of one embodiment of the present invention to a primary storage tank, which may be made of steel, fiberglass, or other conventional materials. The present invention comprises preformed fiberglass capsule sections 30 and 32 that are assembled to a primary tank 34. Capsule section 30 comprises a hollow cylindrical section 36 and integrally formed end cap section 40. Capsule section 32 similarly comprises hollow cylindrical portion 38 and integrally formed end ca section 42. End cap sections 40 and 42 may be flat so as to correspond to the contour of primary tank 34, or may be hemispherical, dished, or otherwise shaped for greater structural strength. Each of capsule sections 30 and 32 are preformed on either male or female molds and substantially cured prior to assembly to primary storage tank 34. Capsule sections 30 and 32 are sized to slide over the ends of primary tank 34 such that their free edges 44 and 46, respectively, meet at about the middle of primary tank 34. (It will be noted that FIG. 1 illustrates the position of capsule sections 30 and 32 before they have been fully mounted to primary tank 34 such that a space remains between free ends 44 and 46.) Referring next to FIG. 2, after capsule sections 30 and 32 are fully mounted on primary tank 34 (not visible in FIG. 2), a fiberglass joint 60 is formed to join together capsule segments 30 and 32. Joint 60 may be formed by applying several layers of resin impregnated fiberglass mats. Alternatively, joint 60 can be formed by applying a chopped fiberglass and resin mixture, preferably with a chopper gun, over the interface. Openings 62 can be cut in the top of the completed secondary containment capsule at the desired locations for any pipe fitting 64. Several layers of resin impregnated fiberglass mat or a chopped fiberglass and resin mixture are applied around fittings 64 to seal openings 62.

FIGS. 5a and 5b illustrate one embodiment of a male mold used to form capsule segment 30 of the embodiment of FIGS. 1 and 2. Male mold 110, which may be a deflatable or collapsible mold as is well known in the prior art, is mounted to mounting plate 114 attached to arbor 120 of rotating positioner 116. Rotating positioner 116 allows rotation of male mold 110 around an axis whose orientation can be changed from a horizontal to a vertical position, or any orientation therebetween. Resin impregnated fiberglass mats or a chopped fiberglass mixture are applied to the outside of male mold 110 as it is being rotated around its longitudinal axis by rotating positioner 116. Slow rotation of male mold 110 ensures that an even fiberglass layer is applied and that the applied fiberglass layer retains an even thickness during curing. Once the applied fiberglass layer has cured, male mold 110 is deflated or collapsed, and completed capsule section 30 is removed.

In the present invention, the same mold may be used to form both capsule sections 30 and 32, or separate molds can be used for each.

FIG. 6 illustrates how a female mold is used to form the capsule sections of the present embodiment. Female mold 140 is again mounted on rotating positioner 116 such that it can be rotated around its longitudinal axis in a horizontal position. A fiberglass layer is then applied to the inside of the mold. This fiberglass layer may consist of hand laid fiberglass mats impregnated with a polyester or other resin, preferably a thermosetting resin, or a chopped fiberglass and resin mixture may be applied by means of a chopper gun or other spraying device (represented by item 142 in FIG. 6). As in the previous embodiment, female mold 140 is slowly rotated, both during application of the fiberglass and during curing, to ensure an even application of the fiberglass layer and to prevent sagging of the applied fiberglass during curing.

For purposes of the present invention, the use of female molds has several advantages over the use of male molds. First, the female mold can be constructed as a simple rigid structure, while the male mold must be collapsible. The male mold must be collapsible because fiberglass shrinks as it cures, and if the mold were rigid, the cured fiberglass would fit so tightly onto the mold that it could not be removed. With the female mold, however, the shrinkage of the fiberglass as it cures tends to loosen the formed fiberglass capsule from the mold, thereby facilitating separation of the formed fiberglass capsule from the mold.

Second, the use of a female mold results in a fiberglass capsule having a smooth outer surface that corresponds to the inside surface of the mold, and a rougher, textured inside surface formed by the applied fiberglass mats or chopped fiber/resin mixture. This textured surface creates a myriad of small cavities and channels that permits a migration of fluid between the primary tank and the secondary containment capsule after the capsule has been fully assembled to the primary tank. Such fluid migration is important to allow the detection of any leakage of fluid through either the primary tank or the secondary containment capsule into the interstice between the primary tank and the secondary containment capsule. If leaking fluid is free to migrate, it will collect at the bottom of the tank, where it can be detected by a sensor. As shown in FIG. 2, the present invention may include a leakage detector access channel 56 formed as part of the end caps of one or both capsule sections. Access channel 56 is simply a hollow passage leading from the top to the bottom of the enclosed tank. If a leak occurs, the leaking fluid will gather at the bottom of the tank and eventually appear in the bottom of detector access channel 56, thereby triggering a leakage detection device which may be placed at the bottom of access channel 56. Such a leakage detection device may comprise an electronic or other sensor, or a leakage detection fluid which changes color or whose level changes in the access channel 56 as a result of leakage.

FIGS. 3, 4 and 8 illustrate alternative embodiments of the present invention in which the secondary containment capsule comprises two molded end caps and one or more molded cylindrical axial sections. In the embodiment illustrated in FIG. 3, the secondary containment capsule comprises end caps 86 and 88, and axial sections 80, 82, and 84. Each of the end caps and axial sections are preformed as in the previous embodiment by applying fiberglass to a male or female mold. The smaller size of each of these segments, as compared to the two capsule halves of the previous embodiments, makes the segments easier to form and easier to assemble to the primary tank. In addition, smaller molds and mold rotating devices can be used. Each segment preferably includes a lip 83 that overlaps the edge of an adjacent segment, thereby forming a lap joint. After adjacent segments have been mounted on primary tank 90, fiberglass in the form of mats or chopped fibers and resin can be applied over the lips 83 to form a joint 92 between adjacent capsule segments.

The lips can either be located on the outsides of the containment capsule segment as illustrated in FIG. 3, or on the inside as indicated by Item 183 in FIG. 4. Placing lips on the inside creates an interstice 85 between the walls of the primary tank and the secondary containment capsule, which can facilitate fluid migration.

FIG. 8 illustrates an embodiment of the present invention in which the secondary containment capsule comprises end caps 186 and 188 and a single axial segment 180. In this embodiment, axial segment 180 may initially be formed on a mold such that it has a wall thickness substantially less than its intended finished wall thickness to facilitate removal from the mold and application of axial segment 180 to the primary tank, or preferably axial segment 180 can be molded to its final finished thickness. For example, axial segment 180 may be molded to have an initial wall thickness of between 25% and 100% of the intended finished wall thickness of the secondary containment capsule. After axial segment 180 is substantially cured, a longitudinal cut 176 is made along one side of axial segment 180. Even if the thickness of axial segment 180 is the full intended wall thickness, axial segment 180 is flexible enough that it can be removed from its mold and wrapped around the primary tank, once cut 176 is made, by bending apart the edges of cut 176. The mounting of axial segment 180 onto the primary tank is thereby greatly facilitated. After axial segment 180 (or a number of shorter segments) has been tightly wrapped around the primary tank, adhesive tape, such as polyethylene tape, can be applied over cut 176 to seal the cut edges together. For this purpose, tape having a width of ¾" is convenient. The elasticity of axial segment 180 biases the edges together such that additional means to hold the cut edges together are generally not required. End caps 186 and 188, which may also initially be molded to only about 25% of their finished thickness, but preferably molded to their final thickness, are mounted on the ends of the primary tank, and the joints between end caps 188 and 186 and axial segment 180 may also be sealed with polyethylene or other adhesive tape. Fiberglass, in the form of resin impregnated mats or filaments or a chopped fiber and resin mixture, is then applied over the joint areas welding end caps 186 and 188 and axial segment 180 together. Preferabaly a weld area approximately 8" wide is formed. If the capsule was initially molded to a thickness less than its intended finished thickness, additional fiberglass will be applied over the whole outside surface of the secondary containment capsule, building up the wall thickness of the secondary containment capsule to its final value. Preferably, in this case, a chopped fiber and resin mixture is applied with a chopper gun while the tank is slowly being rotated on rollers. It should be noted that the previous embodiments of the present invention described above can also be formed by this same process.

Fluid migration can be enhanced by texturing the inside surfaces of the secondary containment capsules, especially along the lower sections of the capsules on which the primary tank rests as indicated by angle A in FIG. 7. Such surface texturing may be molded into a segment if a male mold is used, as the axial splitting of the segments allows easy removal from the mold in spite of the texturing, or a texturing agent may be applied to the segment after it has been formed.

Molded textures may include patterns of bumps, ridges, grooves or other projections or depressions that maintain a space between the secondary capsule and the primary tank. When used with the embodiment of FIG. 8, such texturing allows a tight fit to be maintained between the secondary capsule and the primary tank, allowing the secondary capsule to obtain structural support from the primary tank while still providing for adequate fluid migration.

Such molded textures are formed by forming appropriate patterns in the surface of the male mold used to form the segment. When fiberglass is applied to the mold, a corresponding textured surface will result on the inside surface of the molded segment. In the preferred embodiment, the textured surface comprises a plurality of small, circular protrusions approximately half an inch in diameter and approximately 1/32 inch in height arranged in parallel rows and spaced approximately two inches apart.

If a texturing agent is used, the texturing agent may comprise a mixture of glass fibers and resin, or a mixture of solid particles such as crushed rock, pea gravel, metal pellets, crushed walnut shell, glass beads, sand and resin or any other binder which will adhere to the interior walls of the secondary containment capsule. The texturing agent may be applied evenly or in a furrowed pattern to only the lower portions of the inside surfaces of the secondary containment capsule segments, indicated by angle A in FIG. 7, or the texturing agent may be applied to the entire inside surfaces. Angle A may therefore vary from approximately 30 to 360 degrees.

Texturing may also be accomplished by grooving or abrading the surface with a grinding or milling tool or by abrasive blasting such as sand blasting. Texturing may also be applied to the outside surface of the primary tank in addition to o instead of the inside of the secondary containment capsule, or the primary tank may be made of a material such as diamond plate steel that incorporates a textured pattern in its surface.

Accordingly, a novel secondary containment enclosure for underground storage tank and a method for fabricating the same has been presented. The present invention provides a combination of improved leak protection and ease of fabrication and versatility that was not available in the prior art. Although specific details are described herein, it will be understood that various changes can be made in the materials, details, arrangements and proportions of the various elements of the present invention without departing from the scope of the invention. For example, although the specification refers primarily to the use of a cylindrical primary tank and cylindrical secondary containment capsule, other shapes can also be used. Other kinds of rotating fixtures can be used other than the rotating positioner illustrated in FIGS. 5 and 6, such as for instance, simple rollers on which a female mold can be rotated. In addition to glass fibers, various other kinds of fibers such as Kevlar TM or graphite fibers can be used. The capsule segments can be molded from other curable plastic materials other than polyester resin and fiber mixtures. Other variations will be apparent to those skilled in the art.

I claim:

1. A method for forming a secondary containment capsule for a primary fluid storage container, said primary container comprising first and second ends and a longitudinal middle portion, said secondary containment capsule comprising first and second halves slideably mountable over said first and second ends of said primary container such that said first and second halves of said secondary containment capsule can completely encompass said primary container, said first and second halves of said secondary containment capsule each comprising a free end, said free ends of said first and second halves abutting each other when said first and second halves are mounted on said primary container, said method comprising the steps of:
providing mold means for forming said first and second secondary containment capsule halves;
forming each of said first and second capsule halves by applying a curable plastic material to said mold means, allowing said curable plastic material to substantially cure, and removing said substantially cured capsule halves from said mold means;
applying a texturizing agent to the inner surfaces of said first and said second capsule halves subsequent to said formation of said capsule halves, said texturizing agent including a mixture of a binder and solid particles for creating interstices that enhance fluid migration between the inner surfaces of said capsule halves and the outer surface of said primary container;
slideably mounting said first and second capsule halves over said first and second ends of said primary container such that said first and second halves abut each other and completely encompass said primary container; and
applying a curable plastic material over said abutting ends of said first and second halves.

2. The method of claim 1 wherein said curable plastic material comprises fiberglass reinforced plastic.

3. A method of forming a secondary containment capsule comprising first and second end cap sections and at least one middle section, said method comprising the steps of:
providing a primary container;
providing mold means for forming said end cap sections and middle sections, said mold means for said middle sections comprising male mold means;
forming each of said end cap sections and middle sections by applying a curable plastic material to said mold means and allowing said curable plastic material to substantially cure;
forming a longitudinal cut from a first end to a second end of each of said middle sections to allow said middle section to be separated from its male mold means;
removing said end cap sections and middle sections from said mold means;
applying a texturizing agent to the inner surfaces of said end cap and middle sections subsequent to said formation of said sections, said texturizing agent including a mixture of a binder and solid particles;
mounting said end cap sections and said middle sections adjacent to each other over said primary container so as to substantially completely encompass said container, said textured surface for enhancing fluid migration in the interstices between the inner surfaces of said at least one middle section and the outer surface of said primary container; and
applying a joining means over adjacent ends of said end cap sections and said middle sections and over the longitudinal cuts.

4. The method of claim 3 wherein said middle sections are tightly wrapped around said primary container before applying said joining means.

5. The method of claim 3 wherein said primary container is a steel container.

6. The method of claim 3 wherein said step of applying a texturing agent includes applying solid particles in the form of sand.

7. The method of claim 3 wherein said step of applying a texturing agent includes applying solid particles in the form of crushed rock.

8. The method of claim 3 wherein said step of applying a texturing agent includes applying particles in the form of pea gravel.

9. The method of claim 3 wherein said step of applying a texturing agent includes applying solid particles in the form of metal pellets.

10. The method of claim 3 wherein said step of applying a texturing agent includes applying solid particles in the form of crushed nut shells.

11. The method of claim 3 wherein said step of applying a texturing agent includes applying solid particles in the form of glass beads.

12. The method of claim 3 wherein said step of applying includes the application of a mixture containing a binder being polyester resin.

13. The method of claim 3 further including the step of texturing at least a portion of the outer surface of said primary container.

14. The method of claim 13 wherein the step of texturing the outer surface includes providing said primary tank with diamond plate steel that incorporates a textured pattern on its surface.

15. A method of forming a primary container with a secondary containment capsule thereover comprising the steps of:
providing a primary container;
providing cured thermosetting fiber reinforced plastic end sections, and at least one cured thermosetting fiber reinforced plastic intermediate section which is tightly wrappable around the primary container, said end and intermediate sections having a texturizing agent including a mixture of a binder and solid particles applied to the inner surface therein after said sections are formed;

tightly wrapping the intermediate sections around the primary container so that the edges thereof about the periphery of the primary container approximately abut;

placing the end sections over the exposed ends of the primary container so that the end sections approximately abut the adjacent ends of the intermediate sections;

applying a curable thermosetting fiber reinforced plastic to the end sections and the intermediate sections in regions to bond the end sections and intermediate sections into a sealed secondary containment capsule and curing the same.

16. The method of claim 15 wherein the number of intermediate sections is one.

17. The method of claim 16 wherein when said intermediate section is tightly wrapped around the primary container, the region to be bonded to join the intermediate section to enclose the center section of the primary container extending approximately in an axial direction.

18. The method of claim 17 wherein the primary container is a steel tank.

19. The method of claim 15 wherein said step of texturing includes applying solid particles in the form of sand.

20. The method of claim 15 wherein said step of texturing includes applying solid particles in the form of crushed rock.

21. The method of claim 15 wherein said step of texturing includes applying pea gravel.

22. The method of claim 15 wherein said step of texturing includes applying metal pellets.

23. The method of claim 15 wherein said step of texturing includes applying crushed nutshells.

24. The method of claim 15 wherein said step of texturing includes applying glass beads.

25. A method of forming a secondary containment capsule comprising first and second end cap sections and at least one middle section, said method comprising the steps of:

providing a primary container;

providing mold means for forming said end cap sections and middle sections, said mold means for said middle sections comprising male mold means;

forming each of said end cap sections and middle sections by applying a curable plastic material to said mold means and allowing said curable plastic material to substantially cure;

forming a longitudinal cut from a first end to a second end of each of said middle sections to allow said middle section to be separated from its male mold means;

removing said end cap sections and middle sections from said mold means;

applying a texturizing agent to at least a portion of the inner surface of said at least one middle section subsequent to the formation of said middle section;

mounting said end cap sections and said middle sections adjacent to each other over said primary container so as to substantially completely encompass said container, said textured surface for enhancing fluid migration in the interstices between the inner surface of said at least one middle section and the outer surface of said primary container; and applying a joining means over adjacent ends of said end cap sections and said middle sections and over the longitudinal cuts.

26. The method of claim 25 wherein said step of texturing includes texturing lower sections of said inner surface of said at least one middle section.

27. The method of claim 25 wherein said step of texturing includes forming grooves in the inner surface of said at least one middle section.

28. The method of claim 25 wherein said step of texturing includes abrading.

29. The method of claim 25 wherein said step of texturing includes abrasively blasting.

30. The method of claim 29 wherein the step of abrasively blasting includes sandblasting.

31. A method of forming a secondary containment capsule comprising first and second end cap sections and at least one middle section, said method comprising the steps of:

providing a primary container;

applying a texturizing agent to at least a portion of the outer surface of said primary container after said primary container is provided, said texturizing agent including a mixture of a binder and solid particles;

providing mold means for forming said end caps sections and middle sections, said mold means for said middle sections comprising male mold means;

forming each of said end cap sections and middle sections by applying a curable plastic material to said mold means and allowing said curable plastic material to substantially cure;

forming a longitudinal cut from a first end to a second end of each of said middle sections to allow said middle section to be separated from its male mold means;

removing said end cap sections and middle sections from mold means;

mounting said end cap sections and said middle sections adjacent to each other over said primary container so as to substantially completely encompass said container, said textured surface for enhancing fluid migration in the interstices between the inner surface of said at least one middle section and the outer surface of said primary container; and applying a joining means over adjacent ends of said end cap sections and said middle sections over the longitudinal cuts.

32. A method of forming a primary container with a secondary containment capsule thereover comprising the steps of:

providing a primary container;

providing cured thermosetting fiber reinforced plastic end sections, and at least one cured thermosetting fiber reinforced plastic intermediate section which is tightly wrappable around the primary container;

applying a texturizing agent to at least a portion of the inner surface of said at least one intermediate section after said intermediate section is cured, said texturizing agent including a mixture of a binder and solid particles;

tightly wrapping the intermediate sections around the primary container so that the edges thereof about the periphery of the primary container approximately abut;

placing the end sections over the exposed ends of the primary container so that the end sections approximately abut the adjacent ends of the intermediate sections;

applying a curable thermosetting fiber reinforced plastic to the end sections and intermediate sections into a sealed secondary containment capsule and curing the same, said textured surface for enhancing fluid migration in the interstices between the inner surface of said at least one intermediate section and the outer surface of said primary container.

33. The method of claim 32 wherein said step of texturing includes the application of a binder and solid particles.

34. The method of claim 32 wherein said step of texturing includes texturing lower sections of said inner surface of said intermediate section.

35. The method of claim 32 wherein said step of texturing includes forming grooves in the inner surface of said at least one intermediate section.

36. The method of claim 32 wherein said step of texturing includes abrading.

37. The method of claim 32 wherein said step of texturing includes abrasively blasting said at least one intermediate section.

38. A method of forming a primary container with a secondary containment capsule thereover comprising the steps of:

providing a steel primary container constructed from diamond plate steel that incorporates a textured pattern on its surface to enhance fluid migration between said primary container and the secondary containment capsule;

providing cured thermosetting fiber reinforced plastic end sections, and at least one cured thermosetting fiber reinforced plastic intermediate section which is tightly wrappable around the primary container;

tightly wrapping the intermediate sections around the primary container so that the edges thereof about the periphery of the primary container approximately abut, the interstices formed between said intermediate section and said primary container for maintaining a space between said intermediate sections and primary container and thereby enhancing fluid migration;

placing the end sections over the exposed ends of the primary container so that the end sections approximately abut the adjacent ends of the intermediate sections;

applying a curable thermosetting fiber reinforced plastic to the end sections and the intermediate sections into a sealed secondary containment capsule and curing the same.

* * * * *